(12) United States Patent
McKinlay

(10) Patent No.: US 8,807,896 B2
(45) Date of Patent: Aug. 19, 2014

(54) ANTI-BACK-OUT FASTENER FOR APPLICATIONS UNDER VIBRATION

(71) Applicant: Alistair McKinlay, La Quinta, CA (US)

(72) Inventor: Alistair McKinlay, La Quinta, CA (US)

( * ) Notice: Subject to any disclaimer, the term of this patent is extended or adjusted under 35 U.S.C. 154(b) by 0 days.

(21) Appl. No.: 13/949,278

(22) Filed: Jul. 24, 2013

(65) Prior Publication Data

US 2014/0017028 A1    Jan. 16, 2014

Related U.S. Application Data

(63) Continuation-in-part of application No. 12/541,903, filed on Aug. 14, 2009, now Pat. No. 8,506,223.

(60) Provisional application No. 61/088,962, filed on Aug. 14, 2008, provisional application No. 61/694,493, filed on Aug. 29, 2012.

(51) Int. Cl.
*F16B 39/24* (2006.01)
*F16B 41/00* (2006.01)
*F16B 39/282* (2006.01)

(52) U.S. Cl.
CPC ............... *F16B 39/24* (2013.01); *F16B 41/002* (2013.01); *F16B 39/282* (2013.01)
USPC ........... 411/147; 411/149; 411/432; 411/533; 411/538

(58) Field of Classification Search
USPC ............. 411/7, 147, 149, 204, 205, 326–327, 411/330, 332, 961, 977–978, 432, 533, 538
See application file for complete search history.

(56) References Cited

U.S. PATENT DOCUMENTS

| | | | | | |
|---|---|---|---|---|---|
| 162,167 | A | * | 4/1875 | Holland | 411/136 |
| 518,974 | A | * | 5/1894 | Tinney | 411/145 |
| 866,616 | A | * | 9/1907 | Bollwahn | 411/144 |
| 2,079,056 | A | * | 5/1937 | Warren | 470/16 |
| 2,353,531 | A | * | 7/1944 | Whitney | 411/410 |
| 3,417,802 | A | * | 12/1968 | Oldenkott | 411/134 |
| 3,605,845 | A | * | 9/1971 | Junker | 411/185 |
| 4,223,711 | A | * | 9/1980 | Tabor | 411/188 |
| 4,657,459 | A | * | 4/1987 | Landt | 411/188 |
| 5,080,545 | A | * | 1/1992 | McKinlay | 411/149 |
| 5,314,279 | A | * | 5/1994 | Ewing | 411/134 |
| 5,474,409 | A | * | 12/1995 | Terry | 411/134 |
| 5,626,449 | A | * | 5/1997 | McKinlay | 411/149 |
| 6,776,565 | B2 | * | 8/2004 | Chang | 411/136 |
| 6,935,822 | B2 | * | 8/2005 | Hartmann et al. | 411/161 |
| 2005/0286988 | A1 | * | 12/2005 | Harris | 411/149 |

* cited by examiner

*Primary Examiner* — Roberta Delisle
(74) *Attorney, Agent, or Firm* — Vincent Re PLLC

(57) ABSTRACT

A fastener is disclosed for use in a high vibration application wherein the fastener is engaged to a blind hole. The fastener includes a lock washer including wedge locking action fastening features and a head of the fastener including mating wedge locking action fastening features. The wedge locking action fastening features include a greater inclination than a pitch angle of the fastener such that the fastener is prevented from backing out.

20 Claims, 10 Drawing Sheets

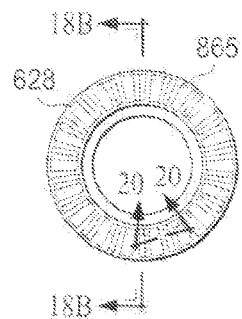
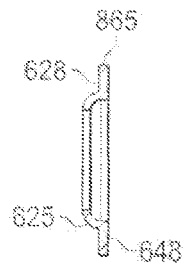
FIG. 18A        FIG. 18B
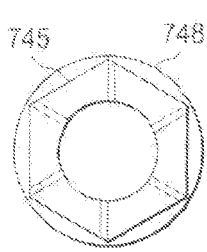
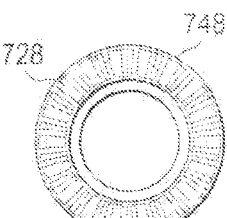
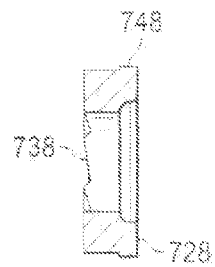
FIG. 19A        FIG. 19B        FIG. 19C
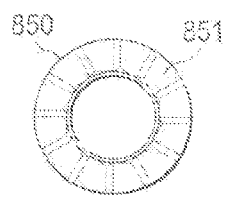
FIG. 20         FIG. 21A
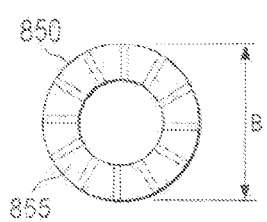
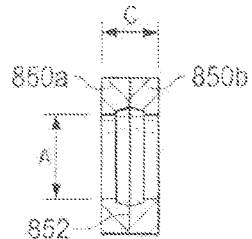
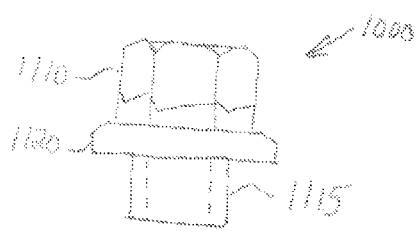
FIG. 21B        FIG. 21C        FIG. 27

ANTI-BACK-OUT FASTENER FOR APPLICATIONS UNDER VIBRATION

CROSS-REFERENCE TO RELATED APPLICATION

This disclosure is a continuation-in-part of U.S. patent application Ser. No. 12/541,903 filed on Aug. 14, 2009 which claims the benefit of U.S. Provisional Application No. 61/088,962 filed on Aug. 14, 2008 and claims the benefit of U.S. Provisional Application No. 61/694,493 filed on Aug. 29, 2012 which is hereby incorporated by reference.

TECHNICAL FIELD

This disclosure is related to threaded mechanical fasteners and more particularly to locking nuts, wheelnuts, and self-tightening nuts including anti-back-out features.

BACKGROUND OF THE DISCLOSURE

A variety of cam locking or "self-tightening" fasteners have been disclosed in the prior art. Such fasteners accommodate a workpiece exposed to vibration. Some prior art devices may be found in U.S. Pat. No. 3,263,727 which issued Aug. 2, 1966 to Arthur B. Herpolsheimer; U.S. Pat. No. 3,417,802 which issued Dec. 24, 1968 to Carl O. Oldenkott; and Canadian Pat. No. 1,320364 which issued Jul. 20, 1993 and to the present inventor and is marketed commercially under the trademark DISC-LOCK.

Such devices usually have one or more washer-shaped pieces having inclined cams on one side and a series of ridges on the other. The washers are mounted so that the cam surfaces will mate. In a typical situation, the washers are mounted on a stud between a nut and the work piece.

Vibration or shock will cause the stud or bolt to elongate. The nut tends to rotate loose. A cam locking device prevents this since the cam rise angle is greater than the lead angle of the thread on the bolt. As the nut rotates relative to the washer, the preload is actually increased, further locking the nut.

One shortcoming of the prior art and commercially available self tightening fasteners is that the stacked nut and washer have a combined height which presents a relatively large profile preventing these fasteners from being used in certain situations, e.g. where there is a small fastener clearance dimension.

In my prior disclosure, the self-tightening fastener's washer is captured by an integral skirt that extends from the bottom of the nut. To date, this skirt has always had a thin wall construction to facilitate a swaging operation which flares over the lower end to retain the washer. This thin wall construction, however, is not conducive to threading. Therefore, to provide an adequate number of threads within the fastener, my prior disclosure had a fastener height to washer diameter ratio of at least 0.54 and more typically about 0.65 (e.g., a height to washer diameter ratio of approximately 0.70 for a W' fastener). While my prior fastener was adequate for some applications, the relatively high profile prevented its use in other applications.

There was therefore a need for a cam locking fastener having both a captive washer and a low profile.

Screws and bolts are threaded fasteners used to fasten two or more objects together. Bolts can be used to fasten two pieces wherein holes in the pieces align and there is access to both sides of the aligned holes—the head of the bolt and the threaded end of the bolt when threaded through the holes are each exposed. A nut can be fastened to the exposed threaded end of the bolt, and the bolt when tightened elastically axially deforms the bolt, creating a tension in the bolt which prevents the nut from backing off. A washer can be used on one or both ends of the aligned holes to disperse force of the bolt and nut over a wider area of the fastened objects. Such an alignment of holes providing for use of a nut and bolt is called a through-hole.

Screws can be used wherein a through-hole is not present. For example, a screw can be used wherein one of the objects includes a through-hole, and a second of the objects includes a drilled hole that ceases in solid material or a blind hole. The object with the through-hole is aligned to the blind hole or a drill is used to create the through-hole and the blind hole. The object with the blind hole can be machined to include threads within the blind hole matching the threads of a screw to be used. In another embodiment, a self-tapping screw can be used in a blind hole constructed of material that is soft enough for the screw to create its own threads. Screws do not include a nut, and instead of having the hardened metal of the nut to fasten and create the tension in the nut to prevent the nut from backing out, screws must depend upon the strength of the material in the blind hole and frictional resistance between the threads of the screw and the blind hole material to prevent the screw from backing out.

Screws can be more likely to back-out than an equivalent nut and bolt design. Such a tendency can be heightened in applications wherein the fastened objects vibrate. Vibration of the objects tends to loosen a screw in a blind hole. Screws utilized in industrial or heavy machinery applications can be exposed to heavy vibration, and loose screws can cause malfunctions or failure in the machinery. One remedy to loosening screws is to frequently check the screws and retighten the screws as needed. Such a method can be labor intensive and potentially hazardous, depending upon a location of the screws to be checked. Another remedy to loosening screws is to utilize an adhesive upon the threads of the screws as the screws are being installed. Such a remedy increases the adhesion of the screw to the material of the blind hole. However, one having skill in the art will appreciate that such a remedy is likely to increase the time that the screw takes to back-out rather than permanently stop the screw from backing out.

SUMMARY OF THE DISCLOSURE

A fastener is disclosed for use in a high vibration application wherein the fastener is engaged to a blind hole. The fastener includes a lock washer including wedge locking action fastening features and a head of the fastener including mating wedge locking action fastening features. The wedge locking action fastening features include a greater inclination than a pitch angle of the fastener such that the fastener is prevented from backing out.

BRIEF DESCRIPTION OF THE DRAWINGS

The description refers to the accompanying drawings in which like reference characters refer to like parts throughout the several views and in which:

FIG. 18A illustrates an exemplary optional secondary washer that can be used with the bolt of FIG. 17A and the lock washer assembly of FIG. 19, in accordance with the present disclosure;

FIG. 18B illustrates the washer of FIG. 18A from a different perspective, in accordance with the present disclosure;

FIG. 19A illustrates a lock washer assembly that can be used with the bolt of FIG. 7, in accordance with the present disclosure;

FIG. 19B illustrates the lock washer of FIG. 19A from a different perspective, in accordance with the present disclosure;

FIG. 19C illustrates the lock washer of FIG. 19A in cross section, in accordance with the present disclosure;

FIG. 20 illustrates one exemplary set of wedge shaped features, in accordance with the present disclosure;

FIG. 21A illustrates an exemplary washer assembly with wedge shaped features, in accordance with the present disclosure;

FIG. 21B illustrates the washer assembly of FIG. 21A from a different perspective, in accordance with the present disclosure;

FIG. 21C illustrates the washer assembly of FIG. 21A in cross section, in accordance with the present disclosure;

FIG. 27 illustrates an exemplary pilot nut with wedge shaped features, in accordance with the present disclosure.

DETAILED DESCRIPTION

Figure 1:
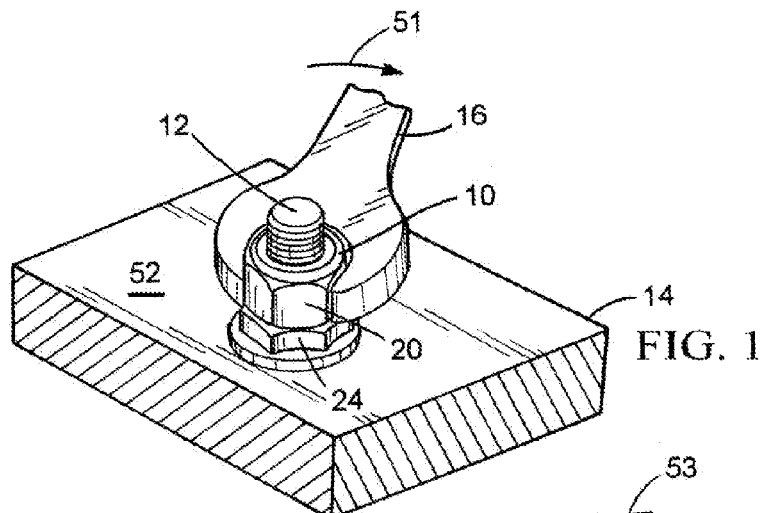
FIG. 1 is a view illustrating a fastener assembly embodying the disclosure being tightened on a workpiece.

Referring now to the drawings, wherein the showings are for the purpose of illustrating certain exemplary embodiments only and not for the purpose of limiting the same, a cam locking fastener 10 is mounted on a threaded stud 12 which is secured to a workpiece 14. A wrench 16 is used for tightening the fastener 10 on the stud in the clockwise direction to apply a load on the workpiece. The wrench is rotated in the opposite direction for loosening the fastener means and releasing the load on the workpiece.

Fastener 10 comprises a nut 20 having a tubular skirt 22, and a locking. Referring to FIGS. 1, 2, 5 and 8, the nut has a six-sided conventional hexagonal external configuration 28 engaged with a conventional nut-receiving opening in wrench 16. Nut 20 has a through opening 30 having an internal threaded surface 30a meshed with the continuous helical thread on stud 12 by application of a wrench 16 to flat multi-sided external surfaces 28. In the preferred embodiment, fastener 10 has a relatively low-profile, where the over-all height of the combined nut-and-washer fastener is approximately one-half of the overall diameter of the washer. For the purposes of this disclosure, the terms "low-profile" and/or "low profile" with respect to the cam locking fastener 10 shall be construed to mean having a ratio of the fastener height to the radially outmost diameter of the washer of less than 0.54 (i.e., 54 percent).

As will be described in greater detail below, nut 20 has a lower camming end face 31. End face 31 engages a mating camming end face 32 on washer 24.

Figure 3:
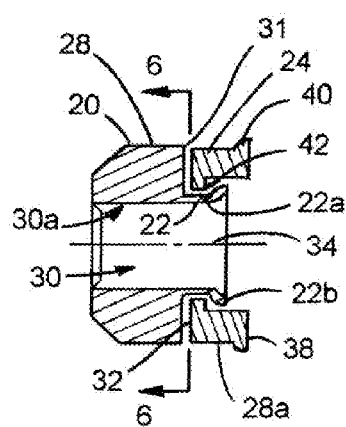
FIG. 3 is a sectional view showing the nut and washer assembly.
Figure 4:
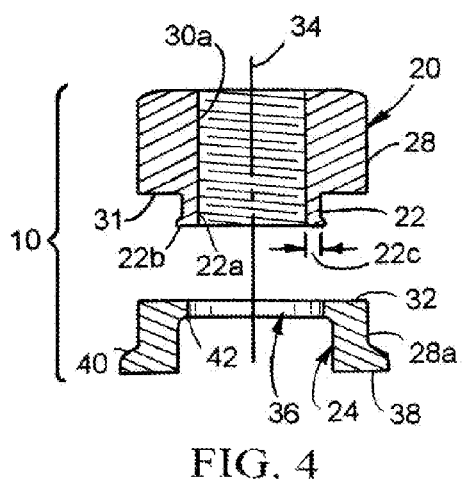
FIG. 4 is a section exploded view showing the nut and washer assembly.
Figure 5:
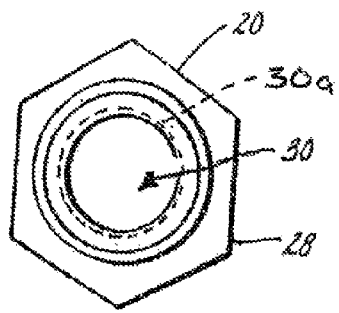
FIG. 5 is a view of the top of the nut.

Skirt 22 has a generally tubular configuration which extends axially along the axis of rotation 34 projecting from the bottom end 31 of the nut. As best shown in FIGS. 3 and 4, the cylindrical inner surface 22a of the skirt is identical in size, shape, and orientation to surface 30a to present a contiguous cylindrical surface. Further, surface 22a receives the same threading as surface 30a, effective to elongate the threaded portion of fastener 10. Thereby allowing for the low-profile height of the fastener 10 while ensuring a proper number of threads intermesh with the threaded stud 12.

The skirt 22 terminates at a flared, annular, outer end 22b. The end 22b can be enlarged or flared by a swaging operation performed after the washer 24 has been placed on the nut skirt 22 to loosely retain the washer 24 to the nut. The maximum external diameter of the skirt is at outer end 22b. The skirt has a minimum external diameter in the region between surface 31 and end 22b. Tubular skirt 22 has sufficient wall thickness 22c to receive the continued internal threading of surface 30a. For example and without limitation, wall thickness 22c may be approximately double the height of a sharp V-thread for the internal thread formed therein (i.e., approximately 1.75 times the pitch of the thread).

FIGS. 4 and 7-9 illustrate washer 24. Washer 24 has an upper camming face 32 which faces toward nut cam face 31. The upper external portion of the washer has a hexagonal configuration 28a, with the same general size and shape as the hexagonal configuration 28 of the nut so that a single wrench 16 can simultaneously engage both the washer and the nut when their hexagonal corners are aligned, one with the other.

The washer has a central opening 36 which is slidably mounted on the cylindrical skirt. The opposite face 38 of the washer is substantially parallel to cam face 32 and forms the lower surface of an annular lip 40 which enlarges the seizing area between the washer and the workpiece. In one non-limiting embodiment (not shown), face 38 has a plurality of equally spaced seizing teeth around the lower face of the washer.

Figure 2:
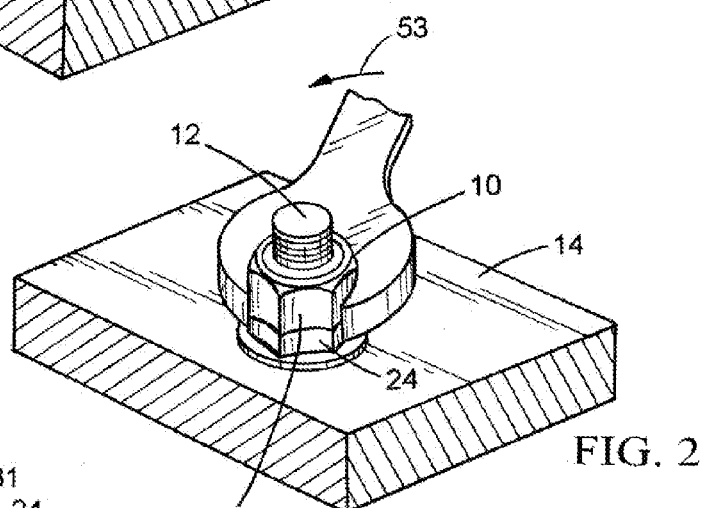
FIG. 2 is a view similar to FIG. 1, but showing a wrench mounted on both the nut and the washer to loosen the assembly from the workpiece.

Referring to FIGS. 3 and 4, opening 36 has a diameter which slidably accommodates the diameter of the skirt 22 but is less than the diameter of end 22b. The diameter of opening 36 is slightly greater than end 22b so that it abuts an annular shoulder 42 when the washer is at the limit of its travel on the skirt. Thus, the washer is moveable toward the nut to an engaged position in which the cam elements on the washer engage the cam elements on the nut. In this position, the nut and the washer may be rotated either in an opposite direction, or together in the same direction, as illustrated in FIGS. 1 and 2. The washer is moveable to a separated position in which the cooperating cam elements clear one another so that the washer can be rotated about the skirt.

Figure 6:
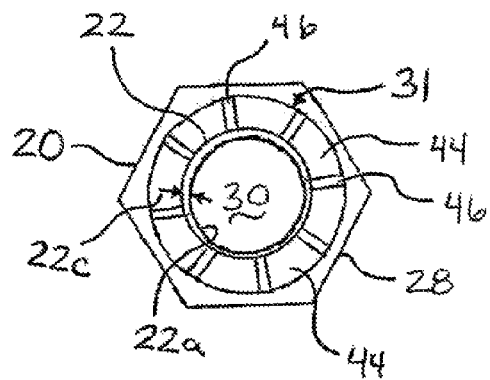
FIG. 6 is a view of the bottom of the nut as seen along line 6-6 of Figure
Figure 7:
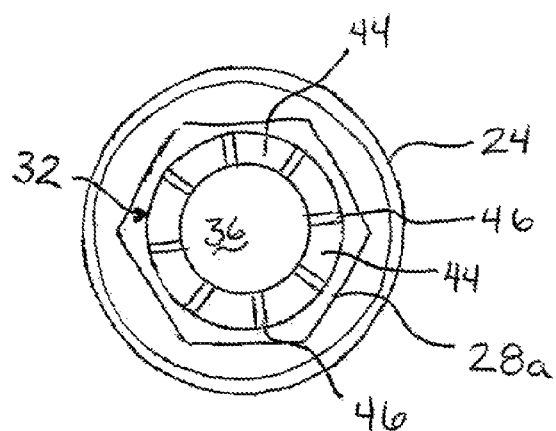
FIG. 7 is a view of the top of the washer.

Referring back to FIGS. 6-8, each camming end surface 31, 32 comprises a plural number of circumferentially-spaced flat ramps 44, and a corresponding number of interconnecting flat shoulders 46. In the illustrated construction, each end face has eight slightly sloped ramps 44 and the same number of steeply sloped shoulders 46. Both the ramps and the shoulders are inclined in the direction of the nut's rotational axis The slope angle of each ramp 44 is approximately eight degrees, and the slope angle of each shoulder 46 is approximately forty-five degrees. The term "slope angle" designates the angle that the respective cam surface (44 or 46) makes with respect to an imaginary radial plane extending normal to the rotational axis 34 of the shank and the fastener assembly. Numeral 48 represents the slope angle of each ramp 44; and numeral 50 represents the slope angle of each flat shoulder 46.

Figure 8:
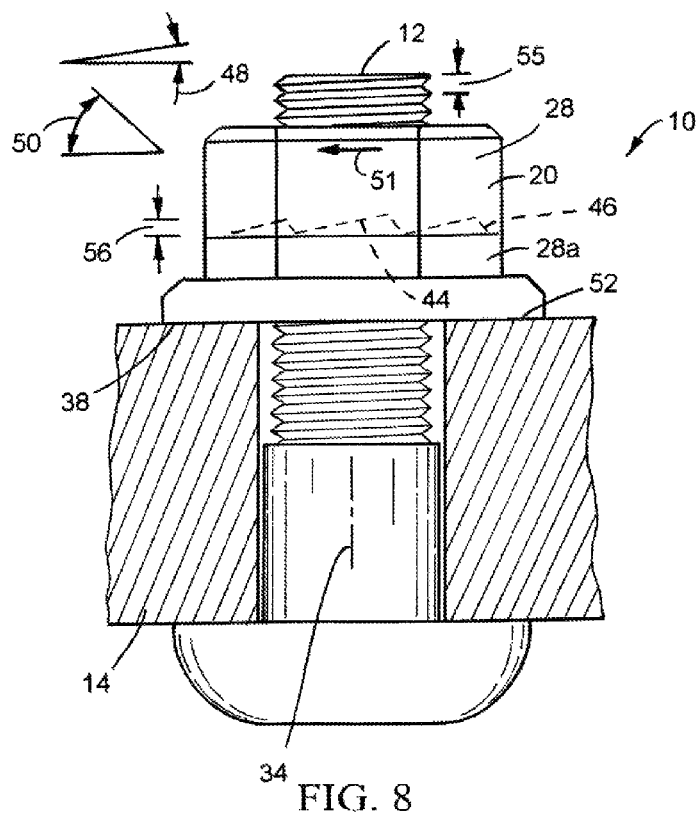
FIG. 8 is a side partial sectional view of the fastener on a stud.
Figure 9:
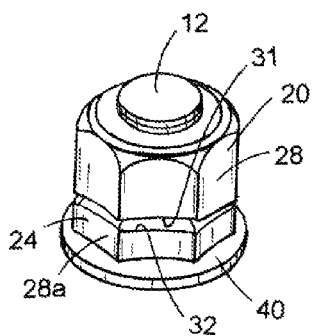
FIG. 9 is a perspective view of the fastener on a stud.

Shoulders 46 and ramps 44 in each camming surface are connected at acute angles, so that the respective cam surface has a continuous, uninterrupted undulating contour. There are no obstructions or ledges preventing relative rotation between the nut and lock washer when the cammed surfaces are inter-engaged, as shown in FIG. 8. It should be appreciated that a greater or lower number of ramps and shoulders can be used than those shown in the FIGs.

In the preferred embodiment, the low-profile height of the combined nut and washer necessitates that a conventional tool, such as wrench 16, will engage both radially outer surfaces 28 and 28a. Nut 20 is threaded onto stud 12 by rotating the nut in the clockwise direction indicated by arrow 51 (FIGS. 1 and 8). During the nut tightening operation, the bottom flat face 38 on the washer becomes frictionally anchored to surface 52 on the associated workpiece. Further rotation of the nut in the arrow 51 direction causes the shoulders on the nut to push shoulders 46 on the washer until the nut is fully tightened.

As shown in FIG. 2, when the nut is rotated in the loosening or counterclockwise direction, shown by arrow 53, either by vibration or deliberately, the ramps on the nut slide up the ramps on the washer. The nut moves to a wedged, locked position between the washer ramps and the threads on stud 12. The lock action is enhanced by the fact that the axial thickness dimensions of shoulders 46 is less than the thread pitch distance of the threads on stud 12 and nut 20. In the drawings, numeral 55 represents the thread pitch distance, whereas numeral 56 represents the axial thickness dimensions of shoulders 46.

Typically, the threads on the stud and nut comprise between 10 to 20 threads per inch, which provides a thread pitch distance 55 of about 0.10" to 0.05". The cam surfaces on the nut and the lock washer will, in such case, have a shoulder axial thickness dimension greater than 0.05", preferably about 0.07" for fine threads and greater than 0.10", preferably 0.12" for coarse threads. The shoulder axial thickness dimension 56 is related to the thread pitch dimension, so that dimension 56 is greater than dimension 55.

Figure 10:
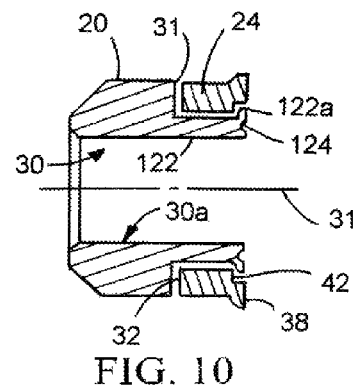
FIG. 10 is a sectional view showing an alternate embodiment of the nut and washer assembly.

In an alternate embodiment of the fastener, shown in FIG. 10, and denoted 110, the skirt 122 is elongated to span almost the entire height of the washer 24, thereby increasing the number of threads in the fastener 110. In this manner, for example, coarser thread-types may be used while providing a sufficient number of threads for proper torque-setting of the fastener to the stud.

In the embodiment illustrated, the bottom edge 122a of the skirt includes an annular channel 124 Channel 124 allows only the radially outer-most edge of skirt 122 to be flared out to retain washer 24, thereby accommodating the increased thickness of skirt 122.

Figure 11A:
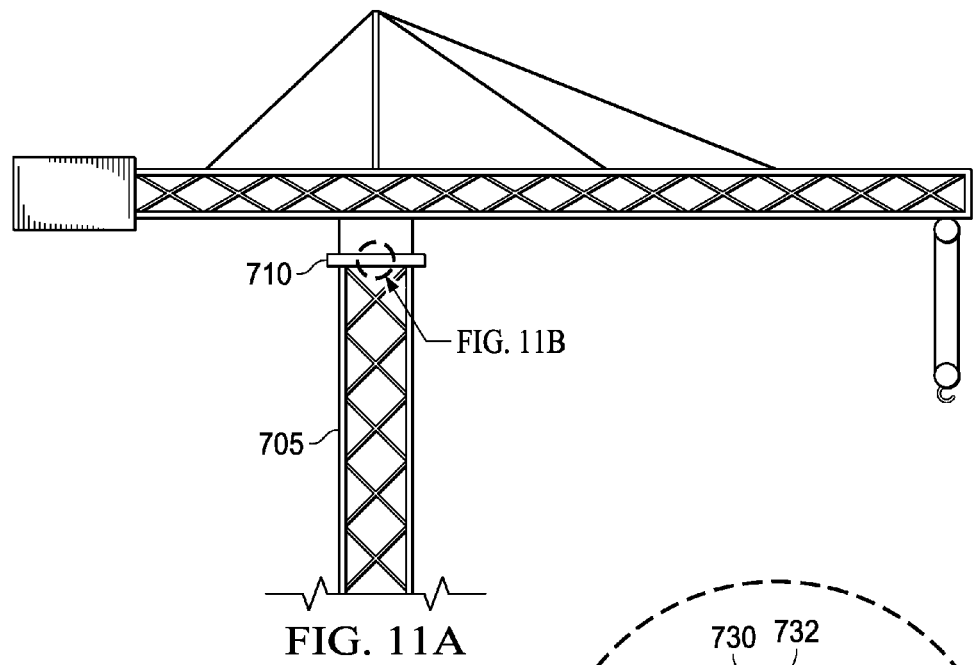
FIG. 11A illustrates an exemplary construction crane including a cut-away section showing an industrial screw with a lock washer assembly having a wedge locking action, in accordance with the present disclosure.
Figure 11B:
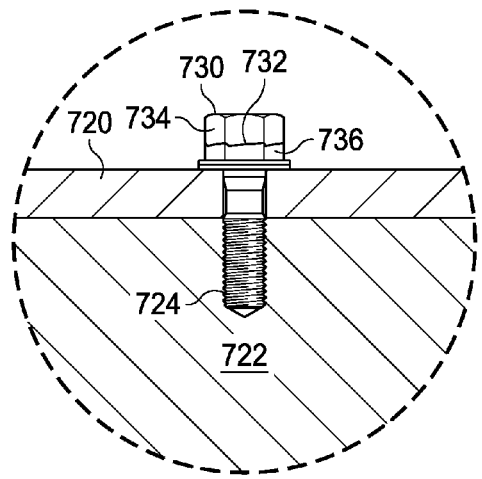
FIG. 11B illustrates the screw of FIG. 11A in greater detail, in accordance with the present disclosure.

FIG. 11A illustrates an exemplary construction crane including a cut-away section showing an industrial screw with a lock washer assembly having a wedge locking action. Crain 705 is illustrated including a slewing ring 710 which acts as a bearing for rotation of the top of the crane. Crane 705 is a large construction machine, and forces in the crane including forces upon slewing ring 710 are large. Load bearing features in crane 705 can be thick pieces that do not accommodate locating through-holes in every location wherein fasteners are required. Industrial sized screws are required, screws with larger dimensions than are typically used or available for most applications, can be required to securely fasten parts within a crane. Cranes are subject to vibration, and a slewing ring of a crane can experience significant vibration. Industry practices include periodically checking all screws upon a crane to refasten any screws that have backed out. Industrial strength adhesives have been used to adhere screws within the blind holes in which they are set, however, results of such adhesives have shown that such adhesives simply provide more time before the screws begin to loosen. Crane 705 is illustrated in FIG. 11B including a cut-away, magnified section showing a screw 730 with a lock washer assembly 732 having wedge locking action fastening members or features, wherein the screw is fastening members of the slewing ring 710. A first object 720 on the crane with a through hole is fastened to a second object 722 with a blind hole 724 with threads configured to receive screw 730 machined thereto. Screw 730 is screwed into place in a clockwise direction and fastened to a specified torque (2,000 ft lbs in one exemplary embodiment.) As screw 730 is fastened into place, each of the threads in blind hole 724 and screw 730 deform, and the deformation applies axial tension within screw 730. Friction resulting between screw 730, blind hole 724 and a surface of object 720 keeps the screw in place. If screw 730 begins to loosen, with the threads of screw 730 beginning to move in a counter-clockwise direction with respect to blind hole 724, a top portion 734 of the head of screw 730, the top portion including wedge locking action feature on a bottom face thereof, would turn with the threads. A bottom portion 736 of the head of screw 730, the bottom portion including a lock washer including wedge locking features on a top face thereof, would not tend to turn with the screw 730. Inclination of wedge feature is limited from getting too large to prevent too high of a torque acting upon screw 730 from acting upon bottom portion 736. The inclination of the wedge features, however, must be steep enough to exceed the thread pitch of screw 30 such that when screw 730 experiences a torque to back-out, an equal but opposite torque from bottom portion 736 will be applied to screw 730 to prevent the screw from backing out. Both top portion 734 and bottom portion 736 include matching head perimeter features, such that a tool matching the perimeter features can be used to unscrew an entirety of screw 730.

Figure 12:
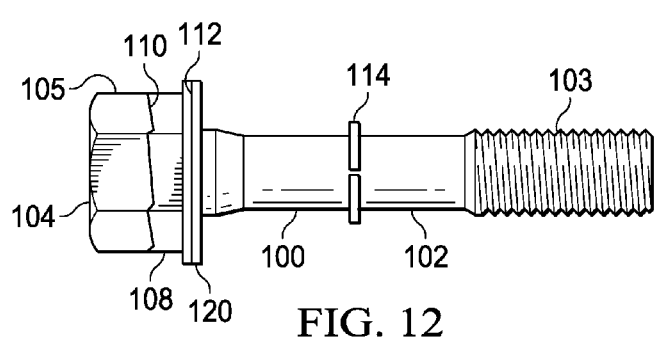
FIG. 12 illustrates an exemplary industrial screw with a lock washer assembly having a wedge locking action, in accordance with the present disclosure.

FIG. 12 illustrates an exemplary industrial screw with a lock washer assembly having a wedge locking action. Screw 100 is illustrated including screw shaft 102, screw head 104, and screw threads 103. Screws envisioned for industrial applications as disclosed herein can include grade 5 or 8 and class 8.8 and class 10.9 fasteners. Head 104 includes a top portion 105 which is physically attached or unitary with shaft 102. Head 104 includes a wedge locking feature characterized by boundary 110. Head 104 includes a bottom portion 108 which includes a locking washer that, when the wedge features are not engaged, is free to spin about the shaft 102 of screw 100. Screw 100 further includes an optional secondary washer 120 configured to spin freely about shaft 102. At a boundary 112 between bottom portion 108 and secondary washer 120, features can exist to prevent bottom portion 108 from spinning relative to secondary washer 120. Such features can include exemplary matching ridges extending radially from a center to a periphery of each piece spaced evenly around the washer surfaces at boundary 112. Secondary washer 120 can be included to prevent galling on a surface of the object which will be fastened next to washer 120. Screw 103 is illustrated with threads 103 formed on shaft 102. Screw 100 is illustrated with an optional retention ring 114 including a thin wire ring which is sized to not easily pass over threads 103 and prevent secondary washer 120 from passing the retention ring 114, thereby keeping the components of screw 100 together for shipment and handling.

Figure 13:
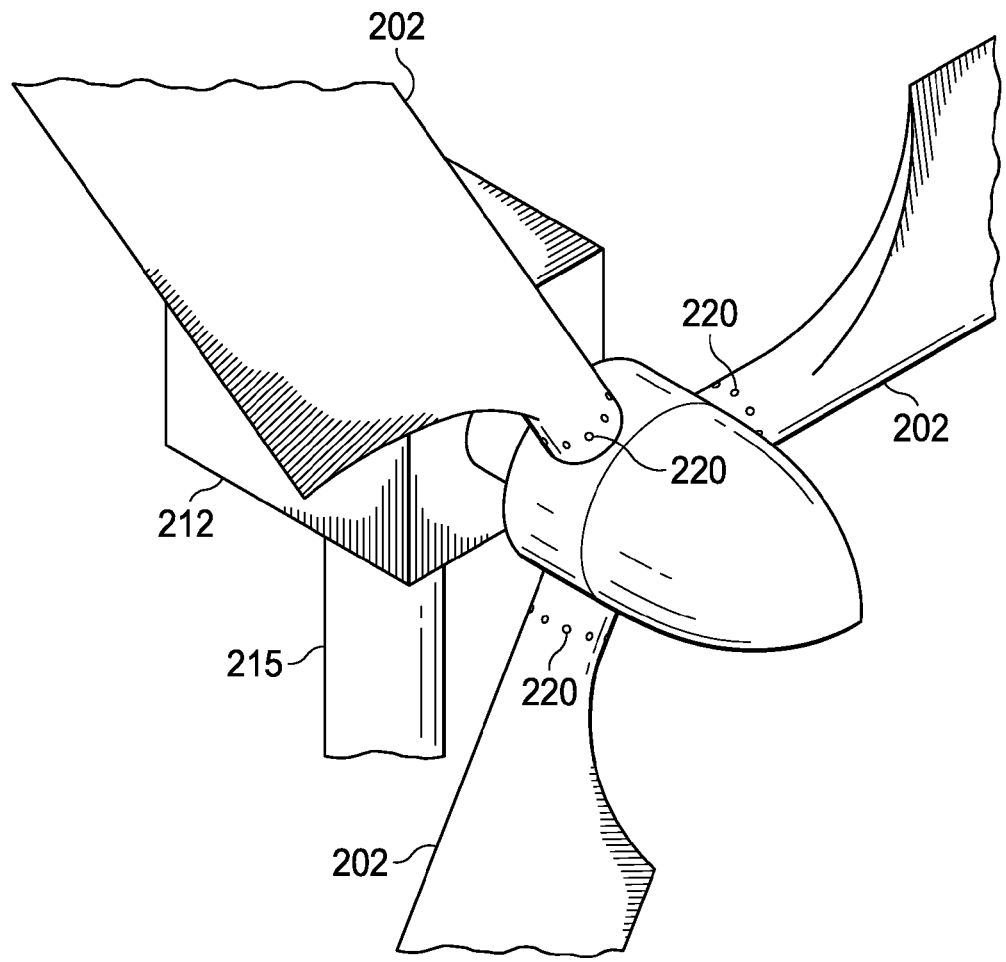
FIG. 13 illustrates an exemplary wind turbine for power generation including blades fastened to the wind turbine using fasteners disclosed herein, in accordance with the present disclosure.

FIG. 13 illustrates an exemplary wind turbine for power generation wherein blades are fastened to the wind turbine using an industrial screw with a lock washer assembly having a wedge locking action. In an application similar to the crane of FIG. 11A, an exemplary wind turbine is illustrated including a tower support 215 and a turbine body 212. The wind turbine includes three blades 202 spinning about a main drive shaft of turbine body 212. The blades are under constant stress and significant vibration throughout the operation of the turbine. Known screws can tend to back-out, requiring difficult maintenance on the wind turbines and risking failure of the blade connection. Industrial screws with a lock washer assembly having a wedge locking action can be used to secure the blades to the main drive shaft. By connecting the blades to the shaft with the industrial screws with a lock washer assembly having a wedge locking action, the screws can be securely fastened to the wind turbine, greatly reducing or eliminating the risk of the screws backing out due to the vibration of the wind turbine.

Other applications wherein vibration causes known screws to back-out can benefit from the use of an industrial screw with a lock washer assembly having a wedge locking action. Locomotives utilize large drive motors that are under constant vibration. These drive motors are large mechanical device and can be in areas of the train that are difficult to reach and provide maintenance. Similarly, trains can include gear cases that are subject to significant and constant vibration. Other embodiments of industrial and heavy equipment are envisioned that can benefit from use of an industrial screw with a lock washer assembly having a wedge locking action, and the disclosure is not intended to be limited to the particular examples provided herein.

Industrial fasteners of any size can use the wedge-shaped anti-back-out features disclosed herein. In particular, fastener sizes of M20 and above can be particularly useful in certain large industrial or commercial applications. In certain conditions such as the crane example of FIG. 1, fastener sizes of M30 and above can be particularly useful. While these particular sizes are mentioned, the disclosure envisions use of methods and configurations disclosed herein upon a wide variety of fastener sizes, and the disclosure is not intended to be limited to the particular examples provided herein.

Figure 14:
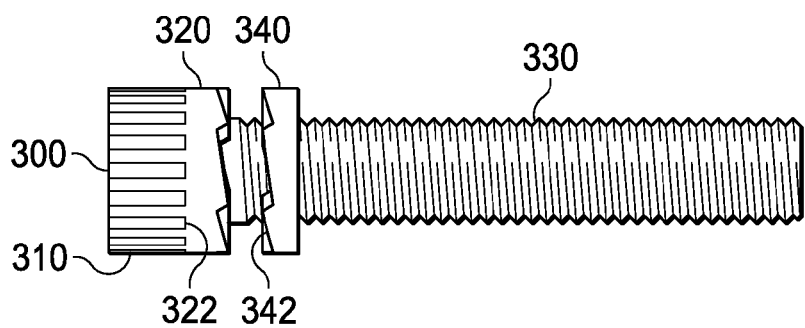
FIG. 14 illustrates a socket-head cap screw with a lock washer assembly having a wedge locking action, in accordance with the present disclosure.

FIG. 14 illustrates a socket-head cap screw with a lock washer assembly having a wedge locking action. Socket-head cap screw 300 is illustrated including head 310 and shaft 330, including threading. A socket-head cap screw with an exemplary hex-shaped drive, a Philips head drive, and a Torx head drive are provided as a non-limiting examples. Socket-head cap screws can be utilized in devices including significant vibration such as a train. Head 310 includes a unitary wedge feature portion 320. Unitary wedge feature portion 320 can be machined or otherwise formed directly into head 320. In an alternative embodiment, a washer including wedge features can be welded or otherwise fastened to head 310 at an exemplary boundary 322. Unitary wedge feature portion 320 is affixed to or is unitary with head 310 and shaft 330 such that all three components spin in unison. Lock washer 340 is illustrated to spin freely about shaft 330 and with wedge features 342 mating to the wedge features of unitary wedge feature portion 320. In one embodiment, lock washer 340 includes a same or similar outer diameter to head 310. As screw 300 is fastened within a hole, tension is created in shaft 330, and lock washer 340 is compressed between head 310 and the surface of the neighboring object being fastened. Friction results between lock washer 340 and the neighboring object, making locking washer 340 resistant to spinning. Wedge features upon portion 320 and washer 340 are inclined greater than the thread pitch on shaft 330 in order to enable the locking washer to prevent screw 300 from backing out. Friction between washer 340 and the neighboring object are functions of the compressive force applied to washer 340, frictional coefficients of the two surfaces, and the geometry including the inner radius and the outer radius of the washer surface. The socket head cap screw is one embodiment of a fastener that can benefit from the disclosed configuration, but other screw and bolt designs can similarly benefit, and the disclosure is not intended to be limited to the particular examples provided herein.

A lock washer assembly having a wedge locking action can be used in a screw to prevent the screw from backing out. A lock washer assembly having a wedge locking action can also be used on a bolt and nut combination providing a clamping force to objects being fastened. By using anti-back-out features on both sides of the bolt and nut combination, the bolt will resist loosening under conditions of high vibration.

In one embodiment, the screw that is threaded into this blind hole has a socket-head cap head acting against the bottom wedge portion. In another embodiment, the screw has a socket-head cap (Torx) head acting against the bottom wedge portion. The type of screw threads can vary from self tapping to a machine thread.

Figure 15:
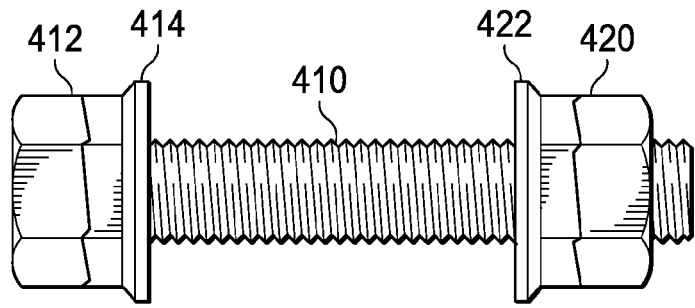
FIG. 15 illustrates an exemplary bolt and nut combination with lock washer assemblies having a wedge locking action on each of the bolt and the nut, in accordance with the present disclosure.

FIG. 15 illustrates an exemplary bolt and nut combination with lock washer assemblies having a wedge locking action on each of the bolt and the nut. Bolt and nut combination 410 is illustrated using lock washer assemblies having a wedge locking action. The wedge-shaped features on the lock washer assemblies are consistent with the wedge-shaped features disclosed herein. Since the head 412 of the bolt includes a lock washer assembly 414 and the nut 420 includes a lock washer assembly 422, both the bolt and the nut are resistant to backing-out under vibration. Such a bolt and nut combination can be used with standard nuts or with heavy hex nuts.

Figure 16:
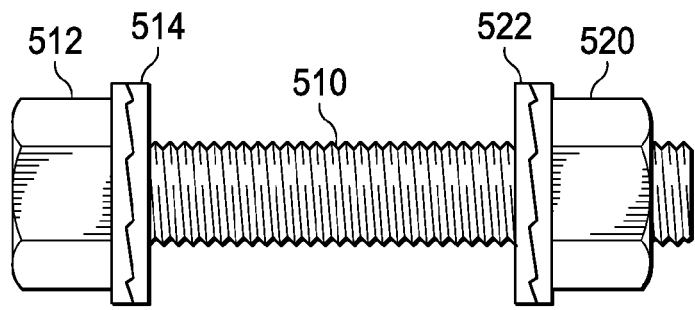
FIG. 16 illustrates an exemplary bolt and nut combination including washer assemblies including a wedge locking action on each end of the bolt and nut combination, in accordance with the present disclosure.

FIG. 16 illustrates an exemplary bolt and nut combination including washer assemblies including a wedge locking action on each end of the bolt and nut combination. Bolt and nut combination 510 is illustrated including bolt head 512, nut 520, washer assembly 514, and washer assembly 522. The wedge-shaped features on the washer assemblies are consistent with the wedge-shaped features disclosed herein. Washer assemblies 514 and 522 include a anti-back-out features as disclosed herein, both the bolt and the nut are resistant to backing-out under vibration.

In one embodiment, the bolt head can be fabricated in a socket-head cap construction. In another embodiment, the bolt head can be fabricated into a socket-heat cap (Torx) construction. Other heat examples are Phillips head or a carriage head bolt style. These are just some of the many different types of fastener head styles available and are not meant to be limiting. The style and type of thread pitches can vary; in one embodiment a course thread can be used. On another embodiment, a fine thread. While this illustrates an exemplary bolt and nut combination including a washer made from case hardened steel, other materials can be used. In one embodiment, the bolt and nut can be made from different materials or from the same materials but heat-treated to different harnesses.

Being made from different materials could be considered beneficial if by doing so it creates a galvanic reaction and causes corrosion that further inhibits the nut and bolt from turning.

While an exemplary bolt size can be M12, other sizes can range from M1 up to M36, and are not to be limiting.

FIGS. 17-26 provide exemplary fasteners and fastener components for use with the anti-back-out features disclosed herein. The examples provided are exemplary and for use in pointing out specific exemplary features of fasteners that can employ the aspects and methods disclosed herein. None of the particular examples are intended to limit the disclosure for use in a particular fastener size or feature range.

Figure 17A:
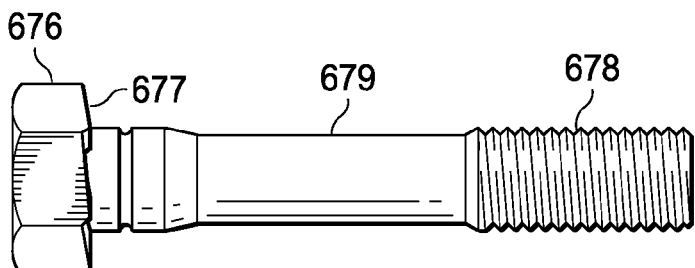
FIG. 17A illustrates a screw including a head with wedge-shaped features that can be used with a matching lock washer assembly, in accordance with the present disclosure.

FIGS. 17A and B illustrate a bolt, including a head 676 with wedge-shaped camming end surface 677 features that can be used with a matching lock washer assembly. Camming end surface 677 features are formed into the bottom of the head when a header machine forms the bolt blank. It later matches with the mating washer in an assembly. This bolt has a long unthreaded shaft 679, closest to the bolt head, followed by the threaded shaft 678. In one embodiment, the ratio of unthreaded shaft 679 to threaded shaft 678 is 1 to 1. In one embodiment, the ratio of unthreaded shaft 679 to threaded shaft 678 is 1 to 2. These ratios can vary and are not meant to be limiting. In one embodiment, a screw is used to fasten one object to another via a threaded blind hole instead of a bolt and nut.

FIGS. 18A and 18B illustrates an exemplary optional secondary washer 618 that can be used with the bolt of FIG. 17A and the lock washer assembly of FIG. 19A. Wedge 628 is a mini cam that is 0.20 deep and is in a radial arrangement along the outside perimeter of washer 618. Washer 618 is not flat but the same area that contains the series of wedge 628s is also on a lowered plain from the center of the washer, as seen in sectional side view 648. While this FIG illustrates 18 wedges, other embodiments may use more or less depending upon the size and design.

The material thickness of washer 618 can vary; in one embodiment, it is thin, only 10 times at thick as the elevations in wedge 628, while in another embodiment, as illustrated in FIG. 18, it is approximately 20 times as thick. In other embodiments, the material thickness can be even greater, approaching 100 times as thick. These are just examples and are not meant to be limiting.

Figure 17B:
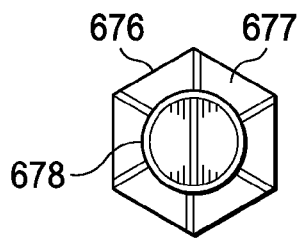
FIG. 17B illustrates the screw of FIG. 17A from a different perspective, in accordance with the present disclosure.
Figure 23A:
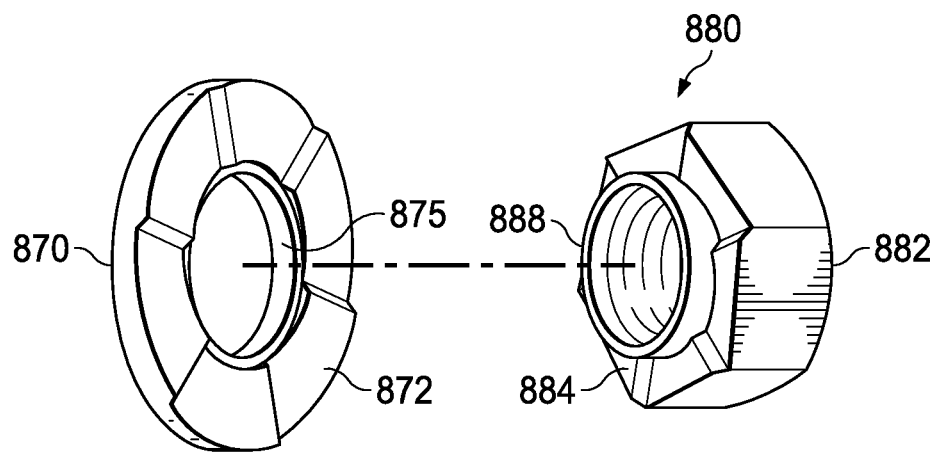
FIG. 23A illustrates an exemplary heavy hex nut with wedge shaped features, in accordance with the present disclosure.
Figure 23B:
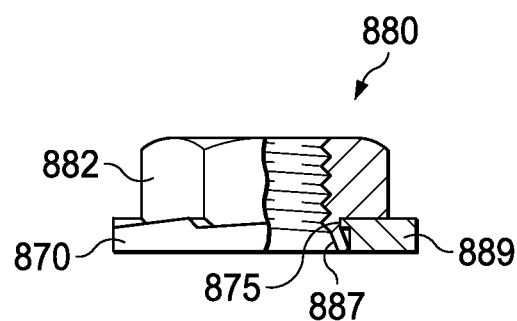
FIG. 23B illustrates the washer assembly of FIG. 23A in sectional view, in accordance with the present disclosure.
Figure 23C:
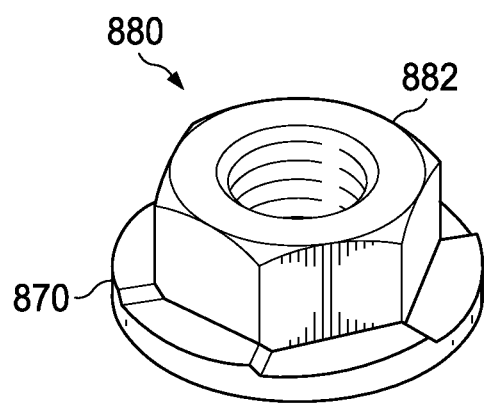
FIG. 23C illustrates the washer assembly of FIG. 23A in a perspective view, in accordance with the present disclosure.

FIGS. 19A-19C illustrate a lock washer 748 that can be used in an assembly with the nut of FIG. 23 the bolt of FIG. 17. FIGS. 23A-23C show the completed assembly. Hex flange 738 is a raised feature on one side while the opposite side of lock washer 748 has 18 camming end surfaces 728.

Friction plays an important role in the performance of lock washers and the type of surface and surface coatings applied to it enhances this. The standard lock washer design starts with being manufactured from standard steel. Heat treating the steel to add hardness will enhance the performance of the camming end surfaces but at the same time this hardness can reduce friction and allow the washer to slide more easily across the surface of the item that it is being fastening to. In one embodiment, the washer can be passivated or etched prior to heat treating, making the surface more rough. In another embodiment, the surface of the washer can be sand blasted prior to heat treating, making the surface rougher. One coating is Geomet 321L (Plus L) coefficient of friction .11. Silver Alkaline cleaning and mechanical blasting.

FIG. 20 illustrates one exemplary set of wedge shaped camming end surface features. FIG. 20 illustrates two exact same camming end surfaces that repeat since they are arrayed radially in a circle. Rising slope 828 is a gentle incline followed by a flat 818 that is parallel to the opposite side. Next is a steep, short, declining slope 808, followed by a bottom flat 838. This pattern then repeats. In one embodiment, the slopes can be steeper than as depected in FIG. 20. In another embodiment, the slops or inclines can be less that depicted in FIG. 20.

In yet another embodiment, the slope can be steeper that that illustrated by rising slope 828 but followed by a less slope more gentle than that illustrated by declining slope 808. The lengths of flat 818 and flat 838 can also vary, being either longer or shorter depending upon the slopes. None of the particular examples are intended to limit the slope angle or length for use in a particular fastener size or feature range.

FIGS. 21A-21C illustrate an exemplary washer assembly with wedge shaped features. It is comprised of two mating washers, washer 851 and washer 855. These washers each have the camming end surface features on the mating surfaces.

Figure 22A:
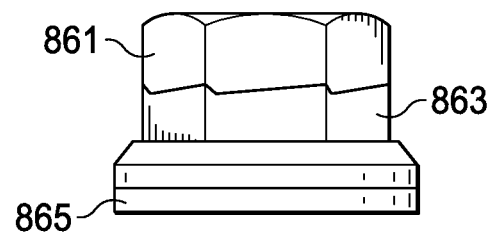
FIG. 22A illustrates an exemplary standard nut with wedge shaped features, in accordance with the present disclosure.
Figure 22B:
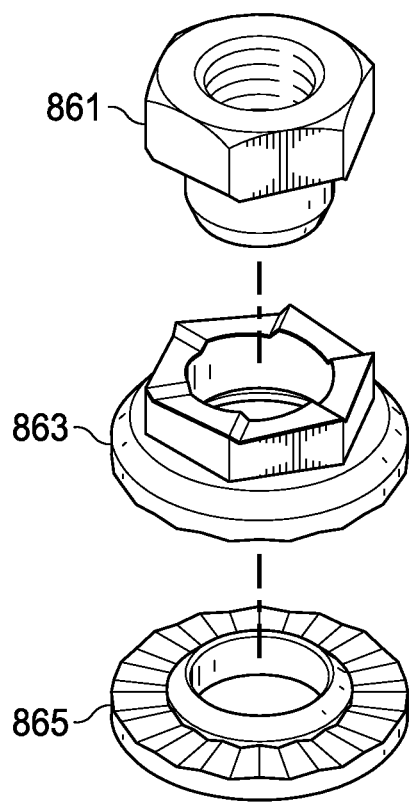
FIG. 22B illustrates in an assembly view the washer assembly of FIG. 21A, in accordance with the present disclosure.

FIGS. 22A and 22B illustrate an exemplary standard DISK LOCK NUT assembly with wedge shaped features. It is comprised of nut 861, nut washer 863, and lock washer 865. The mating surfaces between nut washer 863 and lock washer 865 contain the camming end surface features in a radial pattern. The opposite side of nut washer 863 has the disc-lock features built in that mate with a similar surface on the nut 861. All three together form the DISC-LOCK Nut Assembly.

FIGS. 23A-23C illustrates an exemplary heavy hex nut with wedge shaped features. It is comprised of nut 880 and lock washer 870. The mating surfaces between nut 880 and lock washer 870 have the disc-lock features built in. On nut 880 the DISK LOCK features are rising slope 882 and declining slope 884. On lock washer 872, they are rising slope 882 and declining slope 874. On nut 884, ring 888 slides inside of lock washer 870 during assemble and acts as an locating aid to facilitate assembly and to prevent the lock washer 870 from getting out of position.

Figure 24A:
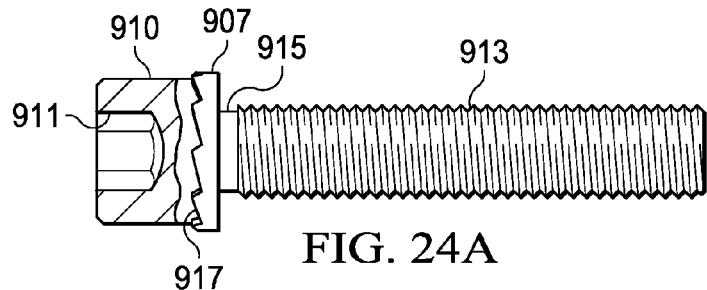
FIG. 24A illustrates an exemplary socket-head cap screw including a lock washer assembly with wedge shaped features, in accordance with the present disclosure.
Figure 24B:
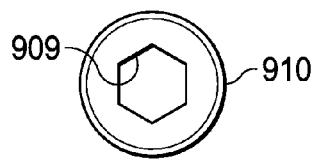
FIG. 24B illustrates the screw of FIG. 24A from a different perspective, in accordance with the present disclosure.

FIGS. 24A and 24B illustrate an exemplary socket-head cap screw, including a lock washer assembly with wedge shaped features. Taking a socket-head blank 911 that has an Allen head hex 909 pattern at the top forms one half of the assembly. At the time of forming this head in the header press from the wire blank, the wedge shaped camming end surface features 917 are also formed. The other half of the assembly is lock washer 907 when it is formed, it also has wedge shaped camming end surface features that will mate with wedge shaped camming end surface features 917. The entire shank of the bolt is unthreaded at this point and the lock washer is simply slid into place. Next, the assembly is placed into a thread rolling machine and the desired thread pitch is rolled onto the shank of the bolt, now shown by threaded 913. Shank 915 is the un threaded area that remains.

In one embodiment, instead of using a bolt bland with a socket-head cap head, a socket-head cap (Torx) head is used instead. In yet another embodiment, bolt blank that has a a hex head is substituted for the socket-head cap. Other bolt and screw heads can be sued such as Phillips head, slot head, Torx head, etc. None of the particular examples are intended to limit the type of bolt or screw head that can be used in a particular fastener size or feature range.

When rolling the threads, there are many different thread pitches to choose and thread diameters, although the diameter is dependent upon the blank. In one embodiment, a thread pitch of M12 used. In another embodiment, a thread pitch of M28 is used. SAE thread pitches can also be used. In one embodiment, a 10-32 thread is used. None of the particular examples are intended to limit the type of screw pitch or diameter that can be used in a particular fastener size or feature range.

The materials in this illustration are heat-treated steel to PC 12.9, but other materials and hardness's can be used. In one embodiment, Aluminum is used. In another embodiment, both the bolt and washer and heat-treated to SAE grade 8. None of the particular examples are intended to limit the type of material or the type of heat-treating of a particular fastener.

Figure 25A:
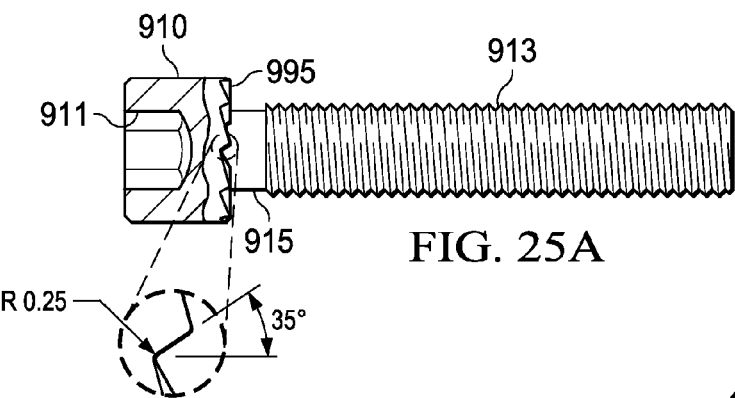
FIG. 25A illustrates the exemplary socket-head cap screw of FIG. 24, in accordance with the present disclosure.
Figure 25B:
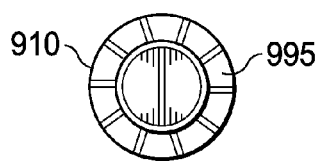
FIG. 25B illustrates the screw of FIG. 25A from a different perspective, in accordance with the present disclosure.

FIGS. 25A and 25B illustrate the exemplary socket-head cap screw blank of FIG. 24A. Anti-back features are illustrated, acting similarly to other similar features throughout the disclosure. FIG. 25 A illustrates in detail exemplary features of the sloped anti-back-out features.

Figure 26A:
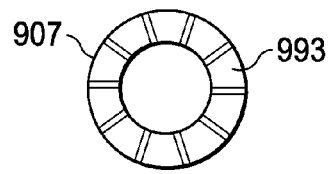
FIG. 26A illustrates the lock washer of FIG. 24A, in accordance with the present disclosure.
Figure 26B:
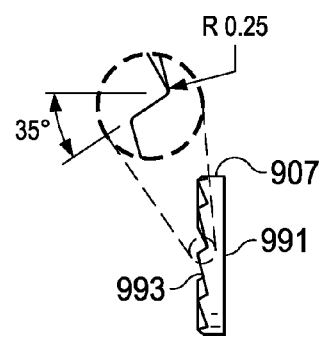
FIG. 26B illustrates the lock washer of FIG. 26A from a different perspective, in accordance with the present disclosure.

FIGS. 26A and 26B illustrates the lock washer prior to its assembly to FIG. 24A. Features are illustrated mating to the anti-back-out features of FIG. 25 A.

FIG. 27 illustrates an exemplary pilot nut with wedge shaped features. Pilot nuts are known in the art. Nut 1000 is similar to the nut of FIG. 22A, with the exception that head feature 1110 includes a shoulder feature 1115 that extends through locking washer 1120 below the washer.

From the foregoing description, one skilled in the art will readily recognize that the present disclosure is directed to a fasteners including anti-back out features. While the present disclosure has been described with particular reference to various preferred embodiments, one skilled in the art will recognize from the foregoing discussion and accompanying drawings that changes, modifications, and variations can be made in the present disclosure without departing from the spirit and scope thereof as is more fully delineated in the following claims The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A fastener for use in a high vibration application wherein the fastener is configured to be engaged to a blind hole, the fastener comprising:
the fastener configured to be engaged to the blind hole;
a lock washer including wedge locking action fastening features; and
wherein the wedge locking action fastening features include a shoulder feature cam surface configured to prevent the fastener from turning relative to the lock washer in a tightening direction and comprising a shoulder feature slope angle of between forty degrees and fifty five degrees between the shoulder feature cam surface and a radial plane extending normal to the rotational axis of a shank of the fastener; and
wherein the wedge locking action fastening features further include a ramp feature cam surface comprising a ramp feature slope angle of between five degrees and fifteen degrees between the ramp feature cam surface and the radial plane extending normal to the rotational axis of a shank of the fastener, wherein the ramp feature slope angle includes a greater inclination than a pitch angle of the fastener such that the fastener is prevented from backing out.

2. The fastener of claim 1, wherein the fastener is engaged to the blind hole located upon an industrial crane.

3. The fastener of claim 1, wherein the fastener is engaged to the blind hole located upon a wind turbine securing a turbine blade to the turbine.

4. The fastener of claim 1, wherein the shoulder feature slope angle comprises forty five degrees.

5. The fastener of claim 1, wherein the ramp feature slope angle comprises eight degrees.

6. A fastener for use in a high vibration application wherein the fastener is configured to be engaged to a blind hole, the fastener comprising:
a socket-head cap screw; and
a lock washer including wedge locking action fastening features; and
wherein the wedge locking action fastening features include a shoulder feature cam surface configured to prevent the fastener from turning relative to the lock washer in a tightening direction and comprising a shoulder feature slope angle of between forty degrees and fifty five degrees between the shoulder feature cam surface and a radial plane extending normal to the rotational axis of a shank of the fastener; and
wherein the wedge locking action fastening features further include a ramp feature cam surface comprising a ramp feature slope angle of between five degrees and fifteen degrees between the ramp feature cam surface and the radial plane extending normal to the rotational axis of a shank of the fastener, wherein the ramp feature slope angle includes a greater inclination than a pitch angle of the fastener such that the fastener is prevented from backing out.

7. The fastener of claim 6, wherein the lock washer comprises a two piece washer including a first piece including the wedge locking action fastening features and a second piece including mating wedge locking action fastening features; and wherein one of the pieces is welded to a head of the fastener to create a unitary head including the wedge locking action fastening features.

8. The fastener of claim 6, wherein the fastener is engaged to the blind hole located upon a train.

9. The fastener of claim 6, wherein the shoulder feature slope angle comprises forty five degrees.

10. The fastener of claim 6, wherein the ramp feature slope angle comprises eight degrees.

11. A nut and bolt fastener configured to be engaged to a through hole, the fastener comprising:
- a bolt head end of the fastener comprising a first lock washer including wedge locking action fastening features; and
- a nut end of the fastener comprising a second lock washer including wedge locking action fastening features; and wherein the wedge locking action fastening features include a shoulder feature cam surface configured to prevent the fastener from turning relative to the lock washer in a tightening direction and comprising a shoulder feature slope angle of between forty degrees and fifty five degrees between the shoulder feature cam surface and a radial plane extending normal to the rotational axis of a shank of the fastener; and wherein the wedge locking action fastening features further include a ramp feature cam surface comprising a ramp feature slope angle of between five degrees and fifteen degrees between the ramp feature cam surface and the radial plane extending normal to the rotational axis of a shank of the fastener, wherein the ramp feature slope angle includes a greater inclination than a pitch angle of the fastener such that the fastener is prevented from backing out.

12. The nut and bolt fastener of claim 11, wherein the nut comprises a standard nut.

13. The nut and bolt fastener of claim 11, wherein the nut comprises a heavy hex nut.

14. The fastener of claim 11, wherein the shoulder feature slope angle comprises forty five degrees.

15. The fastener of claim 11, wherein the ramp feature slope angle comprises eight degrees.

16. A threaded fastener, the fastener comprising:
- a pilot nut comprising:
  - a lock washer including wedge locking action fastening features; and
  - a head comprising a tubular pilot shoulder section extending in a longitudinal direction through and beyond the lock washer; and wherein the wedge locking action fastening features include a shoulder feature cam surface configured to prevent the fastener from turning relative to the lock washer in a tightening direction and comprising a shoulder feature slope angle of between forty degrees and fifty five degrees between the shoulder feature cam surface and a radial plane extending normal to the rotational axis of a shank of the fastener; and wherein the wedge locking action fastening features further include a ramp feature cam surface comprising a ramp feature slope angle of between five degrees and fifteen degrees between the ramp feature cam surface and the radial plane extending normal to the rotational axis of a shank of the fastener, wherein the ramp feature slope angle includes a greater inclination than a pitch angle of the fastener such that the fastener is prevented from backing out.

17. The fastener of claim 16, wherein the shoulder feature slope angle comprises forty five degrees.

18. The fastener of claim 16, wherein the shoulder feature slope angle comprises between forty degrees and forty five degrees.

19. The fastener of claim 16, wherein the ramp feature slope angle comprises eight degrees.

20. The fastener of claim 16, wherein the ramp feature slope angle comprises between eight degrees and fifteen degrees.

* * * * *